United States Patent
Carvalho et al.

(10) Patent No.: US 11,270,124 B1
(45) Date of Patent: Mar. 8, 2022

(54) TEMPORAL BOTTLENECK ATTENTION ARCHITECTURE FOR VIDEO ACTION RECOGNITION

(71) Applicant: BRANDED ENTERTAINMENT NETWORK, INC., Sherman Oaks, CA (US)

(72) Inventors: Schubert R. Carvalho, Orem, UT (US); Nicolas M. Bertagnolli, Orem, UT (US); Tyler Folkman, Lehi, UT (US); Richard Ray Butler, Van Nuys, CA (US)

(73) Assignee: BRANDED ENTERTAINMENT NETWORK, INC., Sherman Oaks, CA (US)

( * ) Notice: Subject to any disclaimer, the term of this patent is extended or adjusted under 35 U.S.C. 154(b) by 0 days.

(21) Appl. No.: 17/350,283

(22) Filed: Jun. 17, 2021

Related U.S. Application Data

(60) Provisional application No. 63/114,344, filed on Nov. 16, 2020.

(51) Int. Cl.
 *G06K 9/62* (2006.01)
 *G06K 9/00* (2022.01)
 *G06N 3/04* (2006.01)

(52) U.S. Cl.
 CPC ..... *G06K 9/00718* (2013.01); *G06K 9/00335* (2013.01); *G06K 9/00744* (2013.01); *G06K 9/6217* (2013.01); *G06N 3/04* (2013.01)

(58) Field of Classification Search
 CPC ............ G06K 9/00718; G06K 9/6217; G06K 9/00744; G06K 9/00335; G06N 3/04
 See application file for complete search history.

(56) References Cited

U.S. PATENT DOCUMENTS

| | | | |
|---|---|---|---|
| 2011/0182469 A1* | 7/2011 | Ji | G06K 9/4628 |
| | | | 382/103 |
| 2018/0225517 A1* | 8/2018 | Holzer | G06K 9/22 |
| 2019/0244366 A1* | 8/2019 | Yu | G06N 3/0454 |
| 2020/0285911 A1* | 9/2020 | Guo | G06N 3/04 |
| 2020/0342236 A1* | 10/2020 | Gong | G06K 9/627 |
| 2021/0042530 A1* | 2/2021 | Kim | G06K 9/00201 |

OTHER PUBLICATIONS

Dosovitskiy, A. et al., "An Image is Worth 16×16 Words: Transformers for Image Recognition at Scale," Oct. 22, 2020, 22 pp.
Jaegle, A. et al., "Perceiver: General Perception with Iterative Attention," Mar. 4, 2021, 14 pp.

* cited by examiner

*Primary Examiner* — Samir A Ahmed
(74) *Attorney, Agent, or Firm* — Soquel Group LLC

(57) ABSTRACT

This invention classifies actions performed within a video clip, by receiving a video clip for analysis, where the video clip comprises a time sequence of video frames, applies a bottleneck attention mechanism to the frames in the clip to generate a reduced sequence of key-frames, applies a 2 dimensional (2D) convolutional neural network to the sequence of keyframes to obtain a 3D embedding tensor for each keyframe, applies a multi-headed attention mechanism to the 3D embedding tensors to generate a final action context, and apples a classification mechanism to the final action context to obtain a probability for each action class that indicates the likelihood that an action specified by the action class occurred in the video clip.

20 Claims, 4 Drawing Sheets

TEMPORAL BOTTLENECK ATTENTION ARCHITECTURE FOR VIDEO ACTION RECOGNITION

TECHNICAL FIELD

Various embodiments generally relate to a method and system for classifying actions in videos that augments a convolutional neural network (CNN) model with a bottleneck attention mechanism.

BACKGROUND

The amount of video content is growing exponentially. Thus, technologies to analyze video content need to be able to scale efficiently. Maintaining high levels of performance while limiting hardware requirements will make it possible to process these large volumes of video data. In this context, deep neural network architectures for video-based human action recognition (VHAR) enable many real-world applications, including understanding and classification of video data, video surveillance, entertainment, and autonomous driving.

Extensive research in convolution neural network (CNN) based algorithms have been proposed for VHAR. One major advantage of two dimensional (2D) CNN models is that they can perform fast image computations and extract meaningful features from high resolution images due to the use of convolutions. However, 2D CNNs perform per-frame operations on video clips, and do not explore the spatiotemporal relationship between frames. To compensate for the lack of temporal modeling, aggregation algorithms or recurrent neural network models (RNNs), e.g. the Long Short Term Memory (LSTM), which is a type of RNN, have been combined with 2D CNNs. 2D CNN+LSTM architectures have shown encouraging results in acquiring spatial patterns and long-range dependencies. Since a video has multiple frames, three-dimensional (3D) CNN architectures are used to retain the feature extraction capabilities of convolutions and also model the motion dynamics. 3D CNNs immediately create hierarchical spatiotemporal representations of video data without the need for LSTMs. In this context, state-of-the-art architectures for VHAR rely on 2D CNN backbones using residual connections (e.g., ResNets), inflated convolutions, temporal segment networks also based on residual networks, but using shift convolutions and 3D CNN. Notwithstanding, both 3D CNNs and LSTM become computationally expensive as the number of frames in a video clip increases.

An efficient way to model temporal dependencies is to use attention mechanisms. Initially introduced to analyze long sequences in language tasks, models with attention have become an area of extensive research for VHAR. Attention mechanisms are processing techniques for neural networks that allow the network to focus on specific aspects of data inputs. In the case of video data, attention mechanisms generate attention scores or weights that indicate the relative importance of frames in a clip or of regions in images.

Models with attention have been combined with LSTM. This enables LSTM to capture the temporal ordering of the frames in a video clip, which may be overlooked by pure attention mechanisms.

Recently, attention models, e.g., the Transformer from Google, used in natural language processing (NLP) have been shown to be effective in visual tasks. The use of Transformers for images is in part possible because of the development of bottleneck attention techniques. These solutions reduce the dimension of images and vectorize them, e.g. create a 1D vector from a 2D image. Bottleneck techniques are standard building blocks used in 2D CNN models, aiming to increase computational performance of deep neural networks.

While current bottleneck attention mechanisms are efficient for reducing image dimensions, there is no bottleneck solution to quickly reduce the temporal dimension of videos, while keeping the exact image size. Such a solution might be used to reduce input data volume by generating a key-frame sequence from raw video input.

Early works on VHAR suggest that a small well-selected set of frames from an input video stream, referred to herein as key-frames, can effectively discriminate human actions. Key-frame selection discards several non-informative frames in a video clip, thus building a sparse sequence representation that can subsequently be used to perform action classification. However, finding such key-frames is challenging because it requires having detailed frame knowledge (e.g., human pose description) for the whole video to select specific frames. It can be time-consuming to describe individual frames because it generally demands human domain expertise for labeling images. Moreover, suppose the selected frames are excessively sparse. In that case, the motion dynamics can break. It may decrease action recognition performance because of high frequencies added to the motion and, consequently, the model parameters.

Current bottleneck attention mechanisms try to compensate for the quadratic scaling problem of the classical Transformer's all-to-all attention. Although these solutions are efficient for visual classification, they don't address the temporal problem faced by video classification models, referred to herein as the clip size dilemma. The longer the video clip, the better the accuracy, but the greater the training time. It is worth pointing out that the use of short video clips contradicts the most recent research in VHAR. Currently long-term temporal convolutions performed on much longer video clips (32- or 128-frame clips) are believed to be required for performance gains. Although this is true, it is proposed herein that compact key-frame sequences (video clips) with more contextual relationships among frames have two principal benefits: 1) Video recognition models can benefit from compact input representations by learning and modeling the data distribution more quickly and accurately. 2) In testing, a network trained on shorter but informative video clips can take advantage of predicting human actions from longer sequences improving recognition accuracy.

Thus, it is with respect to these considerations and others that the present invention has been made.

SUMMARY OF THE DESCRIPTION

This invention uses a new deep end-to-end learning architecture for classifying, or recognizing, actions by humans that occur in video clips, referred to as video human action recognition (VHAR). It introduces a temporal bottleneck attention mechanism, referred to herein as TBoT, which constructs sparse key-frame sequences from longer videos. These sparse sequences are consequently more useful representations for convolution-based models as they significantly reduce computational time while maintaining acceptable results.

To better model motion dynamics, attention weights are computed and centralized around a mean frame. As a result, motions with short displacements from the mean will have small scores and vice-versa. Finally, to strengthen the attention representation of complex actions, we develop a residual mechanism that learns to attend to specific frames. Here, instead of using fully-connected (FC) layers or dot-product operations, we use convolutions and pooling statistics to build a soft residual self-attention mechanism to compute effective contexts for action prediction.

TBoT is flexible enough to be used in different network positions because it relies on a soft pooling self-attention mechanism with no learnable parameters, allowing the use of pre-trained models on large datasets, e.g., ImageNet, a large visual database designed for use in visual object recognition research. Indeed, added at the input side of the network, the TBoT aims to build a compact and contextualized sequence of key-frames for each clip that are used rather than the full set of frames, which are then used to train a model. In this case, TBoT behaves as an effective data augmentation strategy as it mixes the data input, generating data variability.

TBoT incorporates attention mechanisms that enable a convolutional neural network (CNN) to find temporal relationships among frames. The convolutional layers complement the attention mechanisms by extracting useful image features for video recognition. TBoT does not require human intervention to build key-frame sequence inputs. The time necessary to build contextualized-short key-frame sequences from arbitrary video clip sizes is relatively low. The attention mechanisms perform tensor additions and scalar multiplications that are efficiently computed by a GPU's tensor cores. The attention mechanisms include a residual self-attention procedure and a pooling self-attention procedure that process results generated by a 2D CNN model. Taken together, the two attention mechanisms act as a multi-head, building a final compelling action context for classification and prediction.

In certain embodiments, the invention classifies actions performed within a video clip, by receiving a video clip for analysis, where the video clip comprises a time sequence of video frames, applies a bottleneck attention mechanism to the frames in the clip to generate a reduced sequence of key-frames, applies a 2 dimensional (2D) convolutional neural network to the sequence of keyframes to obtain a 3D embedding tensor for each keyframe, applies a multi-headed attention mechanism to the 3D embedding tensors to generate a final action context, and applies a classification mechanism to the final action context to obtain a probability for each action class that indicates the likelihood that an action specified by the action class occurred in the video clip.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Preferred Embodiment, which is to be read in association with the accompanying drawings, wherein.

Figure 1:
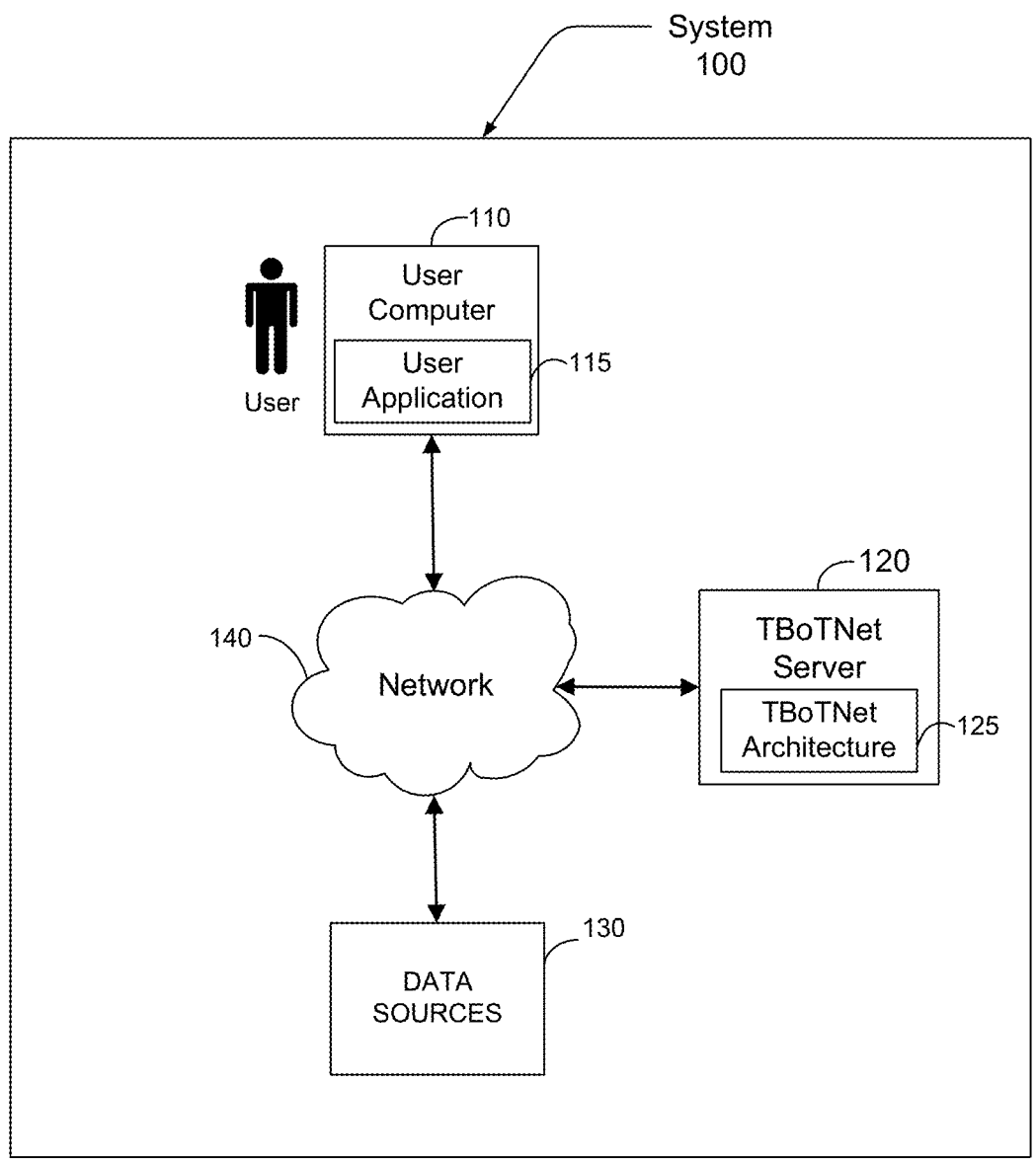
FIG. 1 is a generalized block diagram of a CNN-based system, referred to as TBoTNet, that performs video-based human action recognition (VHAR).

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

The invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be embodied as methods, processes, systems, business methods or devices. Accordingly, the present invention may take the form of an entirely hardware embodiment, an entirely software embodiment or an embodiment combining software and hardware aspects. The following detailed description is, therefore, not to be taken in a limiting sense.

As used herein the following terms have the meanings given below:

Video clip or clip or video—refers to a segment of video that includes multiple frames. As used herein a video includes a primary action.

Human action or action—refers to a movement within a video clip by a person. In other embodiments, an action can refer to an action by another animal or by an inanimate object.

VHAR—refers to video human action recognition, a fundamental task in computer vision, which aims to recognize or classify human actions based on actions performed in a video.

Machine learning model—refers to an algorithm or collection of algorithms that takes structured and/or unstructured data inputs and generates a prediction or result. The prediction is typically a value or set of values. A machine learning model may itself include one or more component models that interact to yield a result. As used herein, a machine learning model refers to a neural network, including convolutional neural networks or another type of machine learning mechanism, which receives video clips as input data and generates estimates or predictions relative to a known validation data set. Typically, the model is trained through successive executions of the model. Typically, a model is executed successively during a training phase and after is has been successfully trained, is used operationally to evaluate new data and make predictions. It must be emphasized that the training phase may be executed 1000s of times in order to obtain an acceptable model capable of predicting success metrics. Further, the model may discover 1000s or even 10s of thousands of features. And many of these features may be quite different than the features provided as input data. Thus, the model is not known in advance and the calculations cannot be made through mental effort alone.

Prediction—refers herein to a statistical estimate, or estimated probability, that an action in a video clip belongs to a specific class or category of actions. A prediction may also refer to an estimate or probability assigned to each class or category within a classification system that includes many individual classes. For example, the Kinetics 400 data set from DeepMind provides up to 650,000 video clips that are classified into 400 different human actions. It is an example of a commonly used training dataset.

Figure 2:
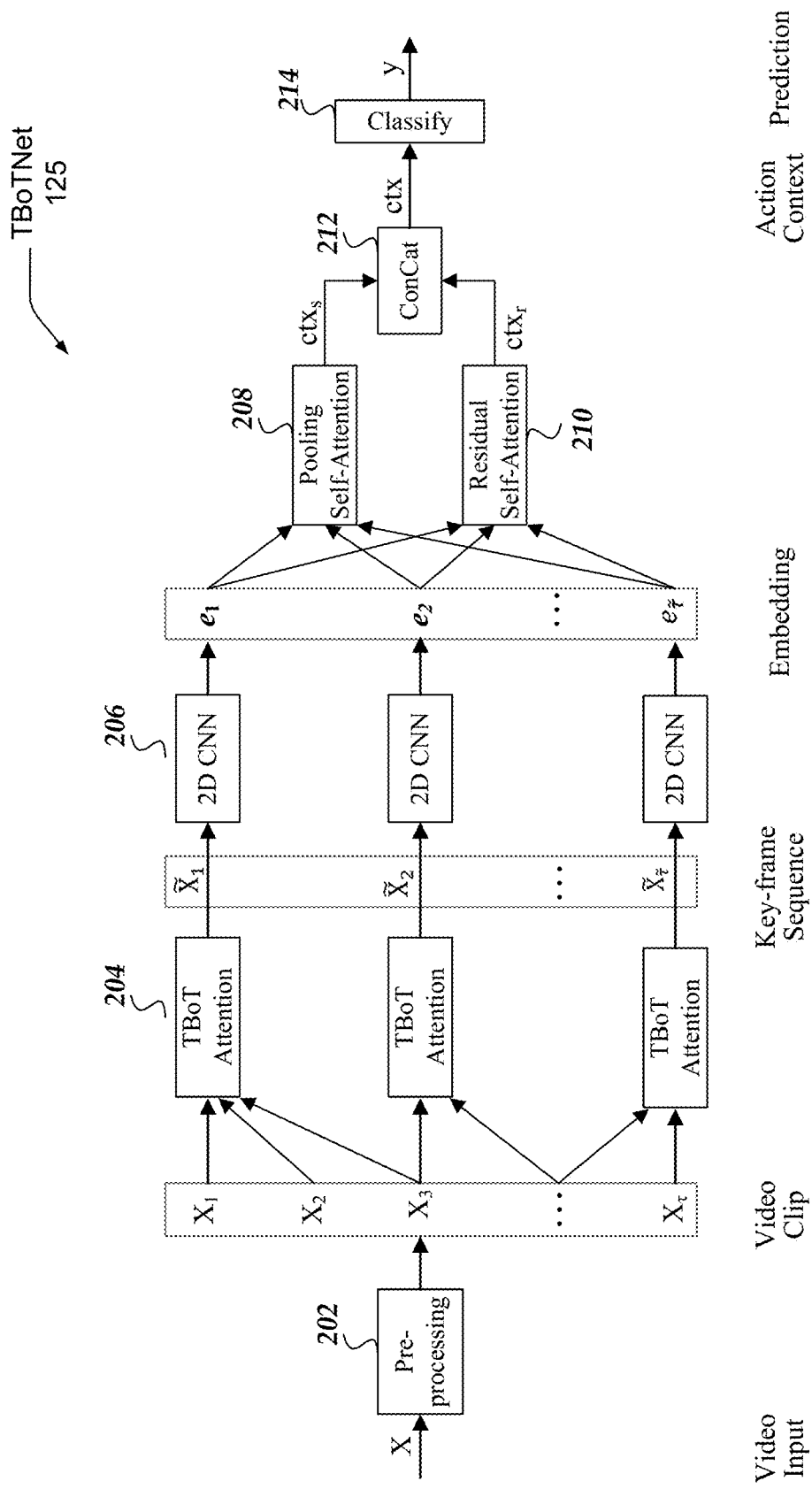
FIG. 2 illustrates an embodiment of a machine learning system, referred to as a temporal bottleneck network architecture with visual attention (TBoTNet).

Architecture—as used herein, refers to an overall set of stages, procedures, or processes performed successively from input data to output data. This is illustrated in FIG. 2, hereinbelow, and includes preprocessing steps such as bottleneck attention processing that is performed before the data is submitted to a CNN or other machine learning model.

Generalized Operation

The operation of certain aspects of the invention is described below with respect to FIGS. 1-5.

FIG. 1 generalized block diagram of a machine learning system 100 that performs video-based human action recognition (VHAR). A TBoTNet server 120 computer executes a TBoTNet architecture 125, or simply TBoTNet 125.

TBoTNet server 120 accesses data sources 130 which provide video clips for analysis. The video clips maybe used during training of the model or may be live input data, used operationally for analysis and classification. For example, YOUTUBE.COM, a website operated by GOOGLE, INC., may be one of data sources 130. Other data sources 130 may include television channels, movies, and video archives. Typically, TBoTNet server 120 accesses video clips from data sources 130 across a network 140, although, in certain embodiments, clips may be provided on physical media like USB drives, hard drives and across other electronic communications media such as direct links. TBotNet server 120 includes a processor, data storage for storing video clips and intermediate results, and a non-volatile memory for storing program code and data.

TBoTNet server 120 may be implemented by a single server computer, by multiple server computers acting cooperatively or by a network service, or "cloud" service provided by a cloud service provider such as AMAZON AWS. Devices that may operate as TBoTNet server 120 include, but are not limited to personal computers, desktop computers, multiprocessor systems, microprocessor-based or programmable consumer electronics, network PCs, servers, network appliances, and the like.

Video clips that are used by TBoTNet 125 include inter alia (1) live video data, training datasets such as the Kinetics 400 dataset used to train machine learning models for purposes of classification, and training datasets such as ImageNet which provide a large number of images and which may be used to pre-train a machine learning model.

A user interacts with TBoTNet server 120 to identify and provide training videos and clips to train TBoTNet model 125. Typically, a user interacts with a user application 115 executing on user computer 110. User application 115 may be a native application or a web application that runs inside a web browser such as FIREFOX from MOZILLA, or CHROME from GOOGLE INC.

User computer 110 may be a laptop computer, a desktop personal computer, a mobile device such as a smartphone or any other computer that runs programs that can interact over network 140 to access TBoTNet server 120. Generally, user computer 110 may be a smart phone, personal computer, laptop computer, tablet computer, or other computer system with a processor and nontransitory memory for storing program instructions and data, a display and an interaction apparatus such as a keyboard and mouse.

TBoTNet 130 typically stores data and executes TBoTNet 125 described hereinbelow with reference to FIGS. 2 and 3A-B.

Network 140 enables user computer 110 and TBoTNet server 120 to exchange data and messages. Network 140 may include the Internet in addition to local area networks (LANs), wide area networks (WANs), direct connections, combinations thereof or the like.

Action Modeling & MR Models

A supervised, machine learning model provides a score or probability estimate for each class in classification set. The score, or probability, indicates the likelihood that a video clip includes an action as represented by a class member. The class with the highest score may be selected if a single prediction is required. This class is considered to represent an action performed by a subject that most likely occurred in the video clip. A validation dataset of video clips in which the primary class is known for each clip is used to train the model by operating the model successively with different clips from the dataset and adjusting the model with each successive model run so as to minimize the error. As used herein, the term subject is used generically to refer to an action performed by a person, animal, or other object within the video clips. The invention is primarily intended to be applied to actions performed by human subjects but is not so limited and may be applied to other moving objects such as animals, and to inanimate objects such as automobiles, balls, etc.

VHAR Bottleneck Architecture

FIG. 2 illustrates an embodiment of a machine learning architecture referred to as TBoTNet 125, that augments convolutional neural networks (CNNs) with a bottleneck attention mechanism and a multi-head attention mechanism. TBoTNet 125 is particularly suited for video-based human action recognition (VHAR). Generally, TBoTNet 125 is a temporal bottleneck network architecture with visual attention. TBoTNet 125 first constructs a sparse or compact representation of each input video clip, i.e. reduced in the temporal dimension, and then uses the reduced input to efficiently learn and classify human actions that are represented in the video clips. It may be appreciated that while processing is described hereinbelow relative to a single video clip, typically a large number of video clips are processed.

A raw video, X, is provided as input to TBoTNet 125. The raw input video is preprocessed to generate video inputs, $X_1$, $X_2 \ldots X_t$, a sequence of video frames in a video clip, the video frames are processed by TBoTNet 125 and the output, $\hat{y}$, is a predicted action vector of class scores (logits). The action vector provides a score for each action class defined by an action dataset, where each value in the vector is a score or probability that indicates the likelihood that the action defined by the action class occurred in the video clip. An action dataset which defines a set of action classes may selected from a well-known set such as the widely used Kinetics 400, 600 or 700 datasets or it may be another known or custom-developed action data set.

Raw video files are first preprocessed at step 202 to generate a series of video clips. Video clips are typically processed in parallel by TBoTNet 125 to achieve high throughput, although they may be processed sequentially as well. Preprocessing typically includes: (1) reducing the resolution of the video through averaging, subsampling or another process to reach a desired video frame size, and (2) clipping or selecting a rectangular region within the reduced resolution frames to further process. The resulting, smaller, video clips are then provided as input to a TBoT 204 bottle-neck attention mechanism 204, or simply TBoT 204.

A temporal bottle-neck attention, referred to as TBoT 204, is applied to the sequence of incoming video frames, aiming to build a reduced, representative, sequence of video clips. TBoT 204 processing is described in further detail hereinbelow with reference to FIGS. 3A, 3B. TBoT 204 reduces the number of frames in a clip, using a bottleneck attention procedure to construct a small sequence of key-frames, which improves performance. Generally, TBoT 204 builds a more compact temporal representation of the raw input data by using a bottleneck attention mechanism to reduce the volume of data while retaining relevant image detail. While attention has previously been used to weight frames and clips and thus improve results it hasn't been used to reduce the volume of data provided to a neural network for subsequent processing.

Next, a 2D convolutional neural network (2D CNN) 206 is applied to the new sequence of clips. 2D CNN 206 creates a 3D embedding tensor for each frame, $e_1, e_2, \ldots, e_{\tilde{\tau}}$. Each embedding tensor represents the extracted characteristics or features of a key-frame. In certain embodiments, a ResNet, or residual network, type of CNN is used. ResNet has proven effective for image recognition and classification. However, a variety of commercially available CNN models, backbone architectures, or other processing systems that extract image features that can subsequently be used for image classification may be used.

Next, an additive pooling self-attention procedure 208 and a residual self-attention procedure 210 are applied to the embedding outputs to construct the soft and residual contexts ($ctx_s$) and ($ctx_r$), respectively.

Then, a concatenation procedure 212 combines the two context's into a single and effective action context (ctx) for each clip.

Finally, the action context, ctx, is fed into a classifier 214 to predict a vector of scores, referred to as logits, $\hat{y}$. Each score measures the importance of an action class. In certain embodiments, a softmax function is applied that transforms the logits into probabilities.

Although the training of the CNN is considered as outside the scope of this invention, the overall system is trained using a loss function such as cross-entropy loss or mean square error (MSE).

Generally, the architecture of FIG. 2 can be grouped into four overall components, which are (1) video clip and embedding representations, (2) early attention, (3) additive self-attentions, and (4) action recognition. Each of the four components is discussed hereinbelow.

It may be appreciated the each of boxes in FIG. 2 may represent steps in an overall method, procedures that are performed entirely in software or hardware or by a combination of hardware. Further, in some cases more than one box with the same reference numeral, e.g. TBoT attention 204, is shown to suggest that the processing may be performed in parallel; however, such processing may also be performed sequentially.

Video Clip and Embedding Representations

First, the representation of a video clip as a sequence of images, or frame\, is considered. Formally, a video clip represented as a 4D tensor is defined as:

$$X=\{x_1, \ldots, x_t, \ldots, x_\tau\}, X \in \mathcal{R}^{C \times \tau \times M \times M} \quad \text{Equation 1}$$

where X is a video clip, $x_t$ is the frame number t in the clip, $\tau$ is the number of frames in the clip, C is the number of channels (here C=3, where the channels are red, green, blue (RGB)), (M, M) is the frame size, i.e. height=width=M pixels. Note that the invention is not limited to square frames, in particular rectangles or any shape and size may be processed. The term M is sometimes referred to as the image or frame dimension.

In normal operation, a number of clips are passed to TBoTNet 125 in batches of clips. For example, 8, 16, 32 and 64 clips may be passed as a batch. Thus, to represent a full video, or sequence of videos an additional index denoting the sequence number in a batch could be added. This would result in a tensor of dimension B×C×τ×M×M where B is the number of clips in a batch to process. The batch indices are omitted here to simplify the notation. The spatial resolution or size per clip is typically M=112 or M=224, although any resolution may be used.

Temporal Bottleneck Attention Mechanism

To compute a sequence of key frames, a temporal bottleneck attention procedure or mechanism, TBoT 204, is employed. TBoT 204 automatically builds compact and contextualized video clips without human intervention. As a result, a network can learn human actions from smaller clips, enabling the training phase to occur quickly and accurately.

Formally, TBoT 204 processes video clips with s frames and builds a new key-frame sequence of size $\tilde{\tau}$, as formulated in Equation 2, below:

$$\tilde{x}_t = \text{TBoT}_t^s(x_1, \ldots, x_s) \quad \text{Equation 2}$$

where $\tilde{x}_t$ is the key-frame computed from the $\text{TBoT}_t^s$ attention at time t, from a video clip with s frames.

In certain embodiments, a pooling self-attention mechanism 208, described with reference to FIG. 4 hereinbelow, computes temporal attention weights which are then applied when combining sequences of temporally contiguous frames to generate key-frames. In other embodiments, a residual self-attention mechanism 210, described with reference to FIG. 5 is used. In yet other embodiments, other attention mechanisms are used.

Figure 3A:
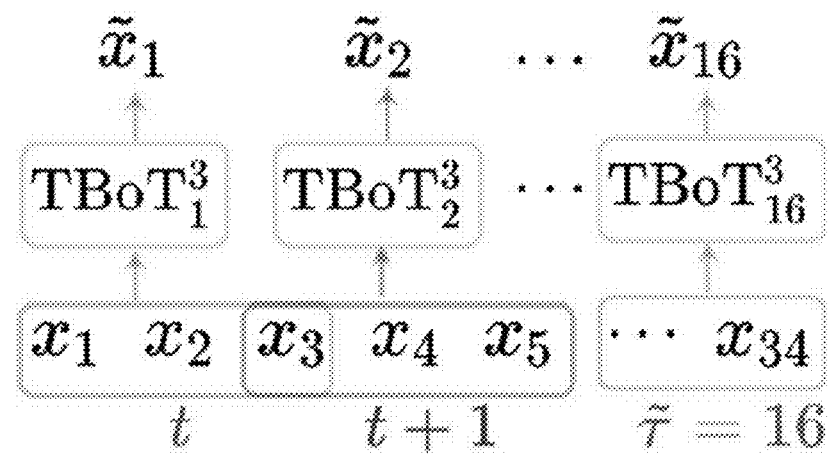
FIG. 3A illustrates a method for reducing a thirty four frame video clip to sixteen keyframes.
Figure 3B:
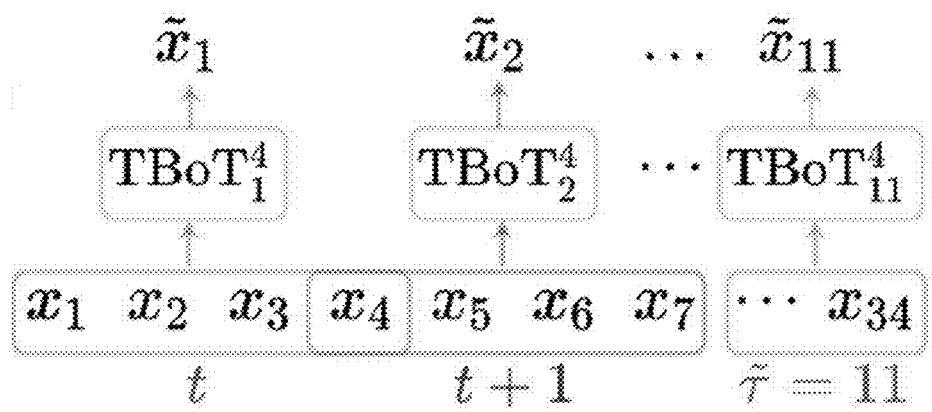
FIG. 3B illustrates a method for reducing a thirty four frame video clip to eleven keyframes.

FIG. 3A illustrates an embodiment of a method performed by TBOT 204 for reducing the number of frames in a clip from 34 to 16; and FIG. 3B. illustrates an embodiment of a method performed by TBOT 204 for reducing the number of frames in a clip from 34 to 11. Generally, a variety of methods for reducing the size of a video input stream are within the scope of the present invention. In FIG. 3A three sequential, i.e. temporally contiguous, input frames are combined to produce each keyframe, starting with the sequence $x_1, x_2, x_3$, which together yield the first key-frame $\text{TBoT}_1$; while in FIG. 3B four sequential input frames are combined to produce each keyframe.

Each key-frame is the weighted average of three frames (FIG. 3A) or four frames (case of FIG. 3B) where the weights are the temporal attention weights computed by the bottleneck attention mechanism.

TBoT 204 generates a new sequence of frames, i.e. a new video clip, defined below in Equation 3, which is then provided or fed into a 2D CNN model at step 206. The difference between the input and output being the number of key-frames versus the number of frames in the input video clip.

$$\tilde{X}=\{\tilde{x}_1, \ldots, \tilde{x}_t, \ldots, \tilde{x}_{\tilde{\tau}}\}, \tilde{X} \in \mathcal{R}^{C \times \tilde{\tau} \times M \times M} \quad \text{Equation 3}$$

Embedding Representation

After applying the pre-attention to the input clips X, the frame sequence $\tilde{X}$, defined in Equation 3, is fed into a CNN model, such as ResNet. ResNet, short for Residual Network is a specific type of neural network that has proven successful in image classification problems. ResNet is available from a variety of open source and commercial sources and can thus be considered as a standard for benchmarking deep learning solutions. More complex feature extractors, e.g. ResNet101 or ResNet152, or optical flow techniques may also be used to obtain more accurate results. Generally, a variety of CNN mechanisms, including those which are commercially available or available through Open Source may be used at step 206.

In certain embodiments, the output of the last convolutional layer of a ResNet50 is used for the embedding representation of each frame clip. It may be noted that the CNN may be pre-trained on a dataset such as the ImageNet dataset, which is widely available.

It is then fine-tuned on the target dataset. Fine-tuning is performed by updating all the model's layers and letting batch-norm layers unfreeze.

The embedding representation of the output of step 206 is described below in Equation 4:

$$E=\{e_1, \ldots, e_t, \ldots, e_{\tilde{\tau}}\}, E \in \mathcal{R}^{C' \times \tau \times M' \times M'} \quad \text{Equation 4}$$

has the same number of frames as the input clip $\tilde{X}$, and its spatial resolution or dimension is M'=4 or 7.

Attention Mechanisms

Although 2D CNNs excel at extracting image features and perform faster computations than 3D CNNs, their equal treatment of video frames is a weakness when it comes to video analysis. In other words, they are limited to quantifying contextual information from video sequences. To mitigate this issue, a combination of temporal contextual frame dependencies with soft and residual self-attentive mechanisms, are used, as illustrated in FIGS. 4 and 5.

Residual Self-Attention

Figure 4:
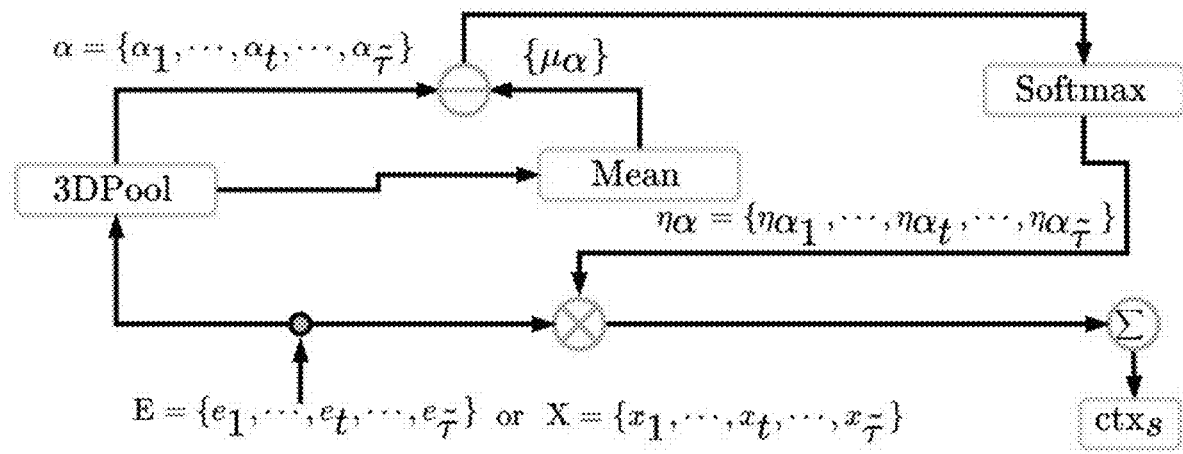
FIG. 4 illustrates one embodiment of a soft pooling self-attention method that is incorporated into TBoTNet.
Figure 5:
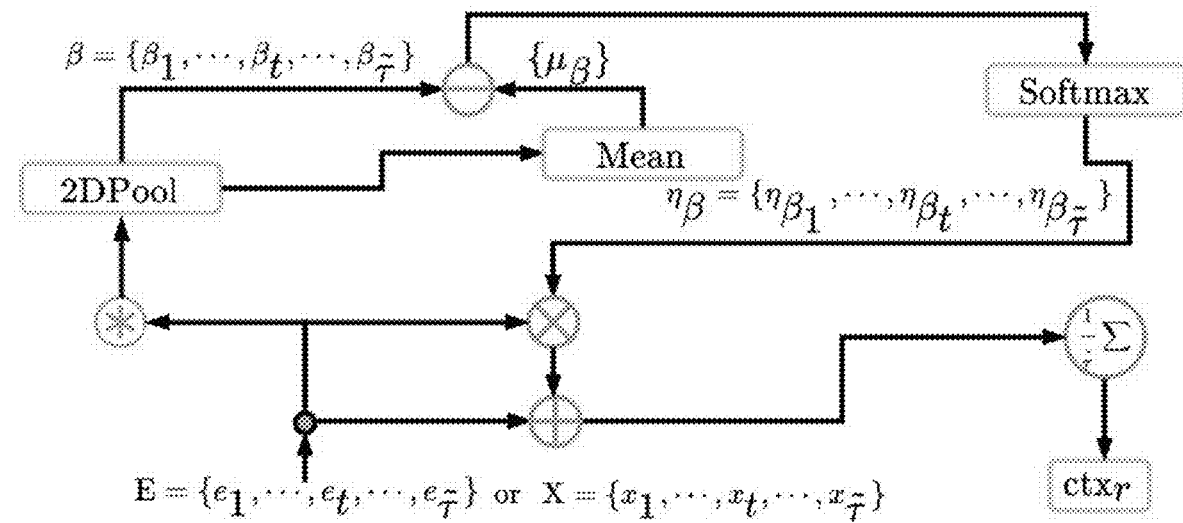
FIG. 5 illustrates one embodiment of a residual attention mechanism that is incorporated into TBoTNet.

FIG. 4 illustrates an embodiment of an attention mechanism, referred to as soft pooling self-attention or pooling self-attention 208, based on pooling statistics, which is incorporated into TBoTNet 125. This approach is used due to its improved performance for fine-grained classification problems. Generally, compared to fully-connected (FC) and dot-product attention mechanisms, pooling is more efficient because it performs only tensor additions and scalar multiplications. Moreover, when used as an—attention mechanism in TBoTNet 125, key-frames are generated by the CPU, freeing the model to analyze miniaturized video clip representations, i.e. keyframe sequences, saving GPU memory and decreasing training time.

More formally, given the embedding outputs, pooling self-attention 208 first computes a weight vector, α, by applying a 3D average pooling over the channels and spatial locations (C'M'M'):

$$\alpha_t = \text{AvgPool3D}(e_t) \quad \text{Equation 5}$$

where $\alpha=\{\alpha_1, \ldots, \alpha_t, \ldots, \alpha_{\tilde{\tau}}\}$ refers to attentional pooling weights that define the relative importance of each frame in a clip. Note that AvgPool3D( ) is a function in the Tensorflow.js open-source library, provided by tensorflow.org, for running machine learning models and deep learning models. It is used to compute 3D average pooling of a tensor's elements.

Next, to better model inter-clip motion displacements, the attention weights are centralized around the mean frame, where the mean frame, pa, is defined in Equation 6 below:

$$\mu_\alpha = \frac{1}{\tilde{\tau}} \sum_{t=1}^{\tilde{\tau}} \alpha_t \quad \text{Equation 6}$$

As a result, motions with tiny displacements from the mean will have small values and vice-versa.

Next, the centralized weights are processed by a softmax function to normalize their values between 0 and 1, which is formulated in Equation 7, below as $$\eta_{\alpha_t} = \frac{\exp(\alpha_t - \mu_\alpha)}{\sum_{t=1}^{\tilde{\tau}} \exp(\alpha_t - \mu_\alpha)} \quad \text{Equation 7}$$

Here, the term $\eta_\alpha = \{\eta_{\alpha_1}, \ldots, \eta_{\alpha_t}, \ldots, \eta_{\alpha_{\tilde{\tau}}}\}$ is a normalized attention vector. By construction, $\Sigma_{t=1}^\tau \eta_t = 1$. This means that no scale is added to the model parameters. This smooths gradient computations during back-propagation. Now, each action frame can be better discriminated by its attention weight.

As a final step, an additive mechanism that multiplies each weight by its corresponding frame to augment the differences among frames in the same clip or sub-clip, is formulated in Equation 8 below:

$$ctx_s = \sum_{t=1}^{\tau} \eta_{\alpha_t} \cdot e_t \quad \text{Equation 8}$$

where $ctx_s$ is a soft action context.

Residual Self-Attention

The attention mechanism's capacity to retain and learn weight vectors representing complex actions relies on how the inputs are transformed throughout the mechanism. Despite linear mappings (e.g., fully connected (FC) layers) being well accepted to increase feature expressiveness, convolutional neural networks (CNNs) are widely used to extract image representations. Thus, to strengthen the attention representation of complex actions, a residual attention mechanism that calculates attention weights for all frames is incorporated into TBoTNet 125.

FIG. 5 illustrates one embodiment of a residual attention mechanism 210 that is incorporated into TBoTNet 125. The model's embedding outputs, E, are convolved with a 1×1 kernel in two dimensions, with a stride of 1, $\tilde{\tau}$ times, generating a 3D tensor with the same length and spatial resolution of E. Next, the convolved tensors are fed into a 2D average pooling function to compute meaningful attention weights, as formulated in Equation 9 below:

$$\beta_t = \text{AvgPool2D}(\text{conv}(e_t)) \quad \text{Equation 9}$$

$\beta = \{\beta_1, \ldots, \beta_t, \ldots, \beta_{\tilde{\tau}}\}$ are learned attention weights. conv( ) denotes a convolutional operation mapping a C' dimensional input filter to an output filter of size 1. Only one convolutional layer is used to perform this mapping.

Next, β is fed into a softmax function, given in Equation 10 below:

$$\eta_{\beta_t} = \frac{\exp(\beta_t - \mu_\beta)}{\sum_{t=1}^{\tilde{\tau}} \exp(\beta_t - \mu_\beta)} \quad \text{Equation 10}$$

where the output or result $\beta_\beta = \{\eta_{\beta_1}, \ldots, \eta_{\beta_t}, \ldots, \eta_{\beta_{\tilde{\tau}}}\}$ is a normalized attention vector.

Finally, a residual attention vector is formulated as below, in Equation 11.

$$ctx_r = \frac{1}{\tau} \sum_{t=1}^{\tau} e_t \cdot (1 + \eta_{\beta_t})$$

Equation 11 where $ctx_r$ is referred to as the residual attention context. The scale $1/\tau$ is necessary to make $ctx_r$ invariant to the clip size. As a result, the model's accuracy with residual attention is no worse than the model with no attention.

Action Recognition

Attention can better capture contextual semantic representations when computed as a multi-head attention mechanism. The term head typically refers to the final processing step in a neural network architecture that yields a final result. As used herein, a multi-head attention runs through at least two different attention mechanisms in parallel. The independent attention outputs are then concatenated, or otherwise combined, to obtain a single output. Different attention heads may be used to analyze parts of an input sequence differently (e.g. longer-term dependencies versus shorter-term dependencies). In the embodiment of FIG. 2, a multi-head attention is used that performs a pooling self-attention 208 and a residual attention 210 in parallel and then concatenating the respective outputs at step 212 to produce a single vector of attention weights, referred to as the final action context. The final action context is computed as: ctx=concat [$ctx_s$, $ctx_r$] with ctx∈ℜ 2·C'×M'×M'. Then classification is performed as the final step.

At step 214 of FIG. 2 class predictions, i.e. classification, are generated by feeding ctx into a Batch Normalization (BN) layer, followed by a conv(2*C', C'/2), ReLU [38], global average pooling, and a FClayer producing the logits vector ŷ—i.e., the class scores before a softmax function—to compute the class probabilities. In certain implementations, a 1×1 conv(2 C', C'/2) is used. The FC receives a 1024-dimensional input and outputs a classification vector whose elements are=the class scores for each of the classes in the classification dataset. Thus, if the Kinetics-400 dataset is used then a 400 dimensional vector is generated. In certain embodiments, a single class, i.e. the class with the largest score in the classification vector, is selected as representing the most likely human action that occurred in the input video, X.

Although back propagation processing to train the weights of the CNN to reduce the error relative to the target dataset is not considered part of the invention, a loss function is employed, such as cross-entropy loss of minimum square error (MSE).

Training and Testing

As previously discussed, in certain embodiments, TBoT-Net 125 includes a convolutional neural network (CNN) model. This model may be pre-trained on the ImageNet dataset. The CNN model is fine tuned with BN layers enabled and no dropout. Input video clip frames are resized to 128×240 for scale augmentation. A 112×112 pixel crop is randomly sampled from each frame-clip on the same Cartesian positions. The crops also undergo random horizontal flipping, and the random RGB and gray-scale augmentation with probability of 0.5 and color distortions of 0.2. A number of consecutive frames, τ, are sampled from consecutive frames from each training video and the remaining frames are discarded. Tests were performed on 8-, 11-, and 16 key-frame clips. The number of input clips tested, τ=34, stride={3, 4, 5}. A batch size of 128 clips per GPU was used for clips of size 8 and 11 and, because of GPU memory capacity, a batch size of 120 clips was used for the 16-frame clips.

The TBoTNet 125 predictions are compared to a training dataset such as the Kinetics 400 dataset and an error is determined, according to a loss function.

Generally, the performance of the TBoTNet 125 architecture was testing using several ablation experiments and it showed substantial improvement in action recognition rates.

The above specification, examples, and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for classifying actions performed within a video clip, comprising:
   receiving a video clip for analysis, the video clip comprising a time sequence of video frames;
   applying a bottleneck attention mechanism to the frames in the clip to generate a reduced sequence of keyframes;
   applying a 2 dimensional (2D) convolutional neural network to the sequence of keyframes to obtain a 3D embedding tensor for each keyframe;
   applying a multi-headed attention mechanism to the 3D embedding tensors to generate a final action context; and
   applying a classification mechanism to the final action context to obtain a probability for each action class that indicates the likelihood that an action specified by the action class occurred in the video clip.

2. The method of claim 1 wherein each key-frame represents a different subset of temporally contiguous frames in the video clip.

3. The method of claim 2 wherein the bottleneck attention mechanism generates either 16 keyframes or 11 keyframes from a video clip of 34 video frames.

4. The method of claim 1 wherein the multi-headed attention mechanism comprises:
   applying a pooling self-attention procedure;
   applying a residual self-attention procedure; and
   concatenating the results of the pooling self-attention and residual self-attention procedures to obtain the final action context.

5. The method of claim 4 wherein the pooling self-attention procedure comprises:
   computing attention weights for each keyframe in a clip based on a 3D average pooling;
   centralizing the attention weights around a mean frame;
   normalizing the centralized attention weights to create a normalized attention vector; and
   multiplying the normalized attention weights by its respective keyframe to augment the differences among them within the clip.

6. The method of claim 4 wherein the bottleneck attention mechanism comprises:
   calculating temporal attention weights for each of the video frames; and
   computing the key-frames, wherein each key-frame is a weighted average of a subset of temporally contiguous frames, wherein the weights are the calculated temporal attention weights.

7. The method of claim 6 wherein the temporal attention weights are generated by the pooling self-attention procedure.

8. The method of claim 4 wherein the residual self-attention procedure comprises:
convolving the embedding tensor outputs with a 1×1 kernel in two dimensions;
computing attention weights for each convolved tensor based on a 2D average pooling;
applying a softmax to the attention weights to generate a normalized attention vector; and
multiplying the weights by the embedding tensor and scaling the result to obtain the residual action context.

9. The method of claim 4 wherein the temporal attention weights are generated by the residual self-attention procedure.

10. The method of claim 1 further comprising:
selecting the highest probability from the action context probabilities to predict the most likely action that occurred in the video.

11. A server computer, comprising:
a processor;
a communication interface in communication with the processor;
a data storage for storing video clips; and
a memory in communication with the processor for storing instructions, which when executed by the processor, cause the server:
to receiving a video clip for analysis, the video clip comprising a time sequence of video frames;
to apply a bottleneck attention mechanism to the frames in the clip to generate a reduced sequence of keyframes;
to apply a 2 dimensional (2D) convolutional neural network to the sequence of keyframes to obtain a 3D embedding tensor for each keyframe;
to apply a multi-headed attention mechanism to the 3D embedding tensors to generate a final action context; and
to apply a classification mechanism to the final action context to obtain a probability for each action class that indicates the likelihood that an action specified by the action class occurred in the video clip.

12. The server computer of claim 11 wherein each keyframe represents a different subset of temporally contiguous frames in the video clip.

13. The server computer of claim 12 wherein the bottleneck attention mechanism generates either 16 keyframes or 11 keyframes from a video clip of 34 video frames.

14. The server computer of claim 11 wherein the multi-headed attention mechanism comprises:
applying a pooling self-attention procedure;
applying a residual self-attention procedure; and
concatenating the results of the pooling self-attention and residual self-attention procedures to obtain the final action context.

15. The server computer of claim 14 wherein the pooling self-attention procedure comprises:
computing attention weights for each keyframe in a clip based on a 3D average pooling;
centralizing the attention weights around a mean frame;
normalizing the centralized attention weights to create a normalized attention vector; and
multiplying the normalized attention weights by its respective keyframe to augment the differences among them within the clip.

16. The server computer of claim 14 wherein the bottleneck attention mechanism comprises:
calculating temporal attention weights for each of the video frames; and
computing the key-frames, wherein each key-frame is a weighted average of a subset of temporally contiguous frames, wherein the weights are the calculated temporal attention weights.

17. The server computer of claim 16 wherein the temporal attention weights are generated by the pooling self-attention procedure.

18. The server computer of claim 14 wherein the residual self-attention procedure comprises:
convolving the embedding tensor outputs with a 1×1 kernel in two dimensions;
computing attention weights for each convolved tensor based on a 2D average pooling;
applying a softmax to the attention weights to generate a normalized attention vector; and
multiplying the weights by the embedding tensor and scaling the result to obtain the residual action context.

19. The server computer of claim 14 wherein the temporal attention weights are generated by the residual self-attention procedure.

20. The server computer of claim 11 further comprising:
selecting the highest probability from the action context probabilities to predict the most likely action that occurred in the video.

* * * * *